United States Patent
Reif

(10) Patent No.: US 11,372,832 B1
(45) Date of Patent: Jun. 28, 2022

(54) EFFICIENT HASHING OF DATA OBJECTS

(71) Applicant: Amazon Technologies, Inc., Seattle, WA (US)

(72) Inventor: Daneel Reif, King, WA (US)

(73) Assignee: Amazon Technologies, Inc., Seattle, WA (US)

( * ) Notice: Subject to any disclaimer, the term of this patent is extended or adjusted under 35 U.S.C. 154(b) by 65 days.

(21) Appl. No.: 16/893,765

(22) Filed: Jun. 5, 2020

(51) Int. Cl.
*G06F 16/22* (2019.01)
*G06F 16/23* (2019.01)

(52) U.S. Cl.
CPC ...... *G06F 16/2255* (2019.01); *G06F 16/2246* (2019.01); *G06F 16/2358* (2019.01)

(58) Field of Classification Search
CPC ............. G06F 16/2255; G06F 16/2246; G06F 16/2358
See application file for complete search history.

(56) References Cited

U.S. PATENT DOCUMENTS

| | | | |
|---|---|---|---|
| 10,261,711 B1* | 4/2019 | Pasirstein | H04L 9/3239 |
| 11,115,461 B1* | 9/2021 | Kim | H04L 67/1097 |
| 2005/0235154 A1* | 10/2005 | Serret-Avila | G06F 21/64 |
| | | | 713/176 |
| 2012/0047284 A1* | 2/2012 | Tarkoma | H04L 67/04 |
| | | | 709/247 |
| 2021/0176038 A1* | 6/2021 | Bortnikov | G06F 9/54 |
| 2021/0303534 A1* | 9/2021 | Solan | G06F 16/27 |

* cited by examiner

*Primary Examiner* — Alicia M Willoughby
(74) *Attorney, Agent, or Firm* — Thomas | Horstemeyer, LLP

(57) ABSTRACT

Disclosed are various embodiments for the efficient hashing of data objects. In one embodiment, a hashing application receives an update to a portion of a data object. The hashing application then generates an updated hash value of the data object by hashing the portion of the data object and at least one stored internal hash value corresponding to one or more portions of the data object that are unaffected by the update.

20 Claims, 5 Drawing Sheets

EFFICIENT HASHING OF DATA OBJECTS

BACKGROUND

Hashing algorithms may be applied to data objects to generate a hash value, which may be thought of as a "fingerprint" of the data object. In this regard, the hash value of one data object may be compared to the hash value of another data object to determine quickly whether the data objects are identical, without having to compare all the data in the data objects. If any data in a data object changes or is updated, a new hash value is generated for the data object. Thus, a data object will be associated with a different hash value when its state changes. Data object hash values have many applications, including caches to determine whether a most recent version is cached, and integrity verification to make sure that no data has been modified.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to efficient hashing of data objects. In order to generate a hash value for a data object, the entirety of the data object is normally processed by a hashing algorithm. While hashing may be considered a relatively fast operation for small data objects and primitives, hashing large data objects can be computationally expensive at scale. Also, a change to even a single bit in a data object may necessitate rehashing the entirety of the data object to generate the updated hash value. In some scenarios, a large data object may have a particular data field that changes frequently and many other data fields that seldom or never change. The frequent changes to the particular data field would cause frequent rehashing of the entire data object, including the many other data fields that have not changed, which wastes computational resources and produces slower results.

Various embodiments of the present disclosure introduce nested hashing approaches to generate data object hash values more efficiently. As will be described, a data object may be divided into a plurality of portions, where individual portions are hashed separately. The hash values of the individual portions may then be hashed themselves to generate a hash value of the entire data object. Consequently, if changes to the data object affect only a single portion of the data object, the hash values of the non-affected portions need not be regenerated and may be reused in computing the updated hash value for the entire data object.

As one skilled in the art will appreciate in light of this disclosure, certain embodiments may be capable of achieving certain advantages, including some or all of the following: (1) reducing computing resource consumption (e.g., in terms of processor time, memory consumption, and power consumption) in generating a data object hash value by reducing the quantity of data to be processed by a hashing algorithm, (2) improving the performance of computer systems and networks by providing faster results in rehashing data objects, (3) making otherwise impractical hashing calculations for large data sets practical by achieving logarithmic time complexity in place of linear time complexity, and so forth.

Figure 1A:
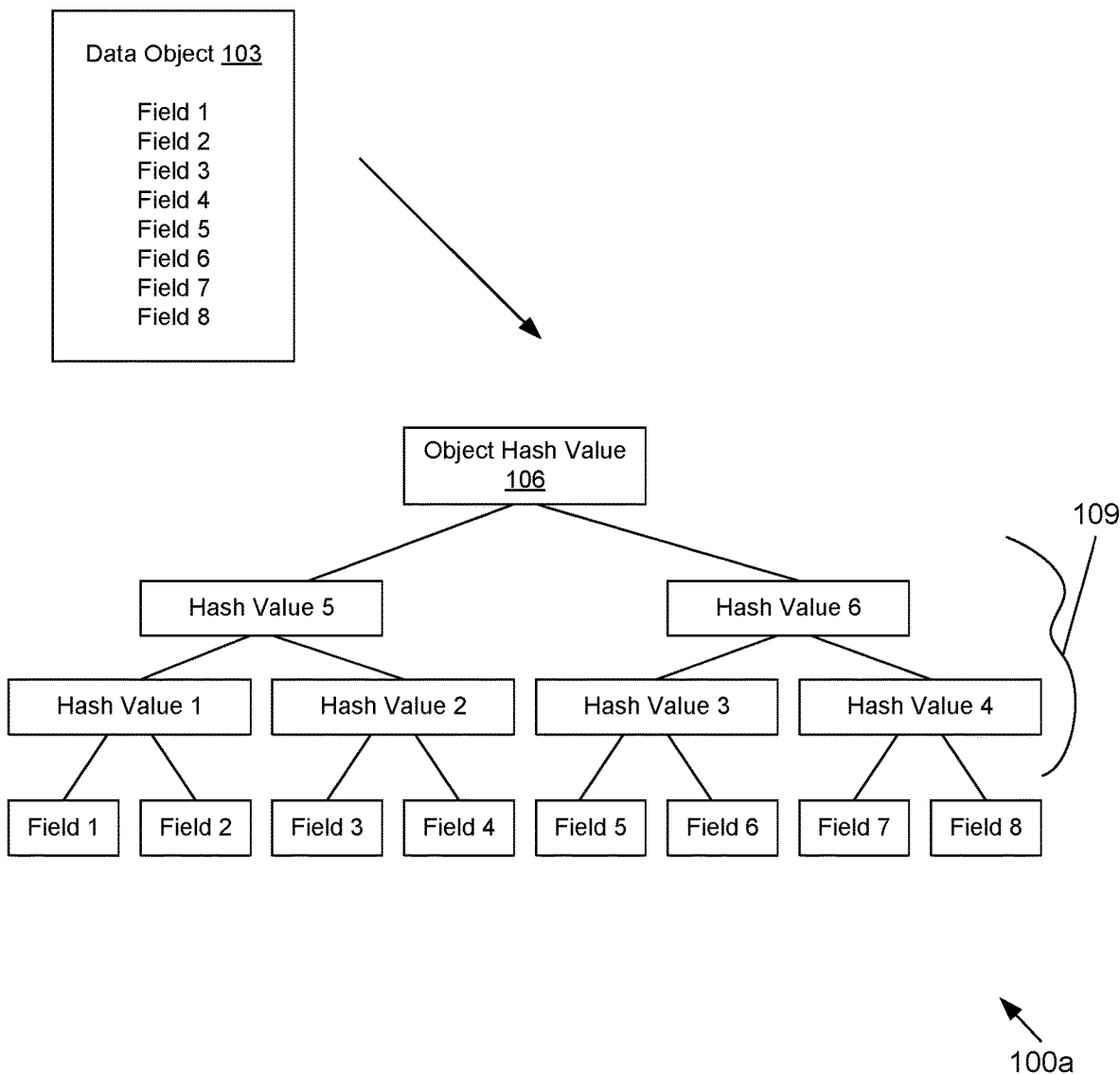
FIGS. 1A and 1B show example tree structures for recursively hashing a data object according to various embodiments of the present disclosure.

Turning now to FIG. 1A, shown is an example tree structure 100a for recursively hashing a data object 103 according to one or more embodiments. The data object 103 has a number of fields, in this case, Fields 1 through 8. The fields may correspond to data primitives, such as character strings, integers, floating point numbers, Boolean values, and so forth, or the fields may correspond to other objects, which may in turn incorporate fields and objects.

The tree structure 100a is used to generate an object hash value 106 for the data object 103. While conventional object hash values 106 are generated by applying a hashing algorithm to the entirety of fields in data objects 103, the object hash value 106 in this example is the product of applying a hashing algorithm to two internal hash values 109 in the tree structure 100a. Looking from the bottom of the tree structure 100a upwards, the fields are considered leaf nodes of the tree structure 100a. Hash Value 1 is generated by hashing Field 1 and Field 2, Hash Value 2 is generated by hashing Field 3 and Field 4, Hash Value 3 is generated by hashing Field 5 and Field 6, and Hash Value 4 is generated by hashing Field 7 and Field 8. At the next intermediate node level, Hash Value 5 is generated by hashing Hash Value 1 and Hash Value 2, and Hash Value 6 is generated by hashing Hash Value 3 and Hash Value 4. Finally, the object hash value 106 is generated by hashing Hash Value 5 and Hash Value 6.

Initially generating Hash Values 1 through 4 alone uses only trivially more resources than generating the object hash value 106 according to a conventional approach, but the efficiencies of the present disclosure become apparent when the object hash value 106 is updated when the state of the data object 103 changes. For example, if just Field 1 is updated, only Hash Values 1 and 5 and the object hash value 106 are regenerated, while stored versions of Hash Values 2 and 6 can be used in the hashing process. Consequently, Fields 3 through 8 need not be rehashed when Field 1 is updated, which can yield significant computing resource savings, particularly if Field 1 changes frequently. It is noted that the depth of the tree structure 100a is logarithmically related to the number of leaf nodes in the tree, which yields an efficient implementation with complexity of O(log N). In other examples, each field may have its own respective hash value, meaning that not even Field 2 would be rehashed to compute Hash Value 1. Also, in other examples, the internal hash values 109 may be generated based on numbers of child nodes greater than two.

Figure 1B:
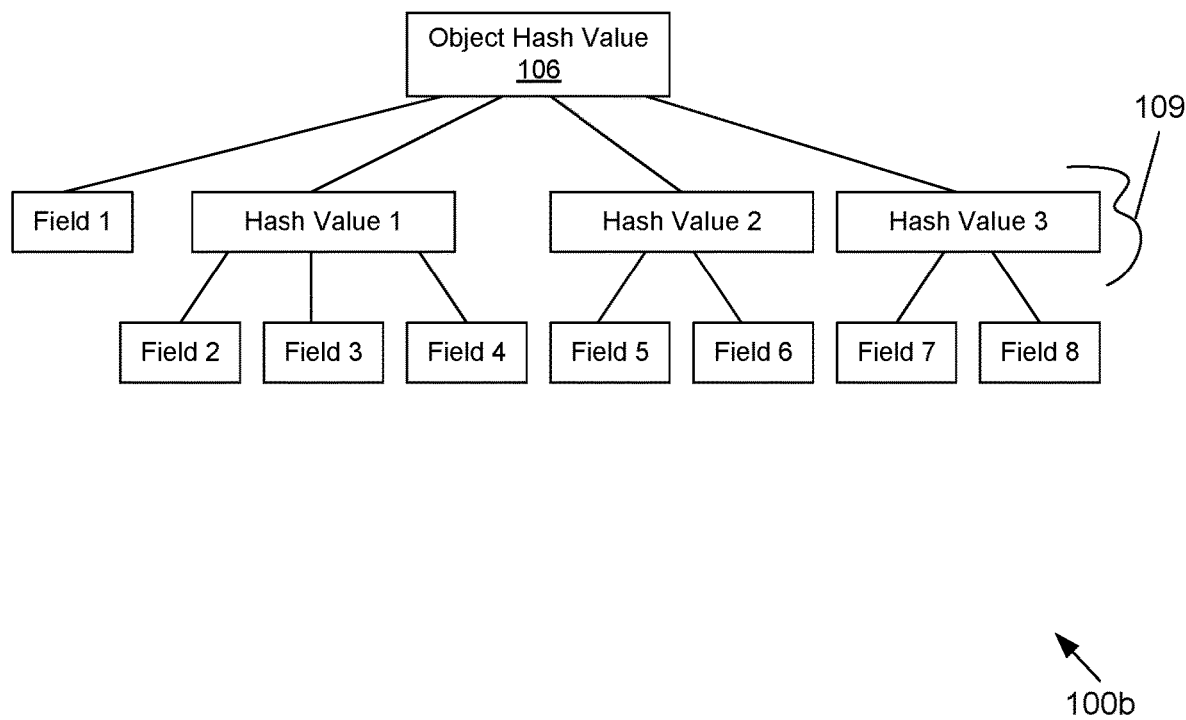

Moving on to FIG. 1B, shown is another example of a tree structure 100b according to one or more embodiments. In this example, it has been observed or predicted that Field 1 is frequently updated. As such, Field 1 has been promoted to a higher level in the tree structure 100b. When Field 1 changes, a hashing algorithm need only hash Field 1, Hash Value 1, Hash Value 2, and Hash Value 3, while Fields 2 through 8 are not rehashed, producing a performance improvement over the tree structure 100a. In the following discussion, a general description of the system and its components is provided, followed by a discussion of the operation of the same.

Figure 2:
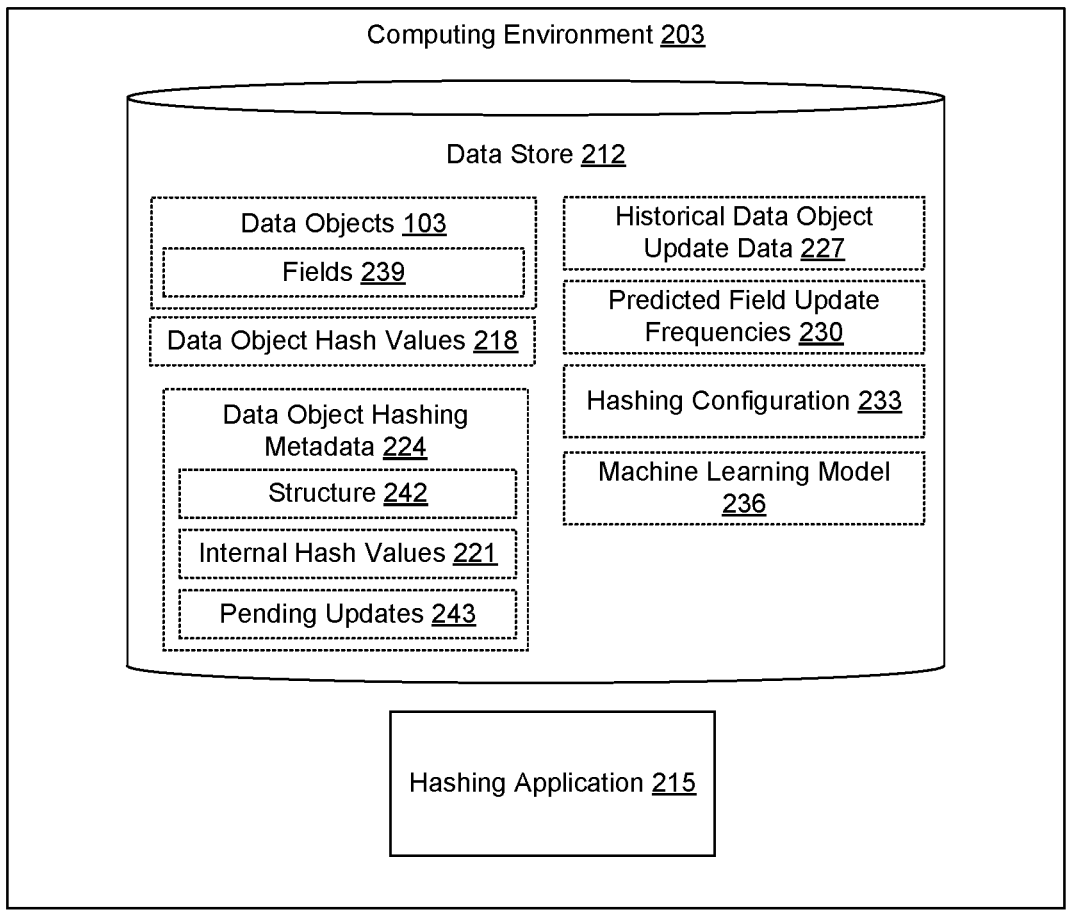
FIG. 2 is a schematic block diagram of a computing environment according to various embodiments of the present disclosure.

With reference to FIG. 2, shown is a computing environment 203 according to various embodiments. The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include a hashing application 215 and other applications, services, processes, systems, engines, or functionality not discussed in detail herein. The hashing application 215 is executed to generate data object hash values 218 that represent data objects 103. To this end, the hashing application 215 may employ one or more hashing algorithms, such as MD5, Secure Hash Algorithm 1 (SHA-1), Secure Hash Algorithm 2 (SHA-2), RIPE Message Digest (RIPEMD), and other hashing algorithms. Rather than generating the data object hash value 218 over the entire data object 103, the hashing application 215 instead generates one or more internal hash values 221 for portions of the data object 103 and then generates the data object hash value 218 based at least in part on the internal hash values 221. This enables more efficient rehashing of the data object 103 when only portions of the data object 103 are changed. In addition, the hashing application 215 may analyze update data for data objects 103 in order to predict an optimal hashing structure for a given data object 103.

The data stored in the data store 212 includes, for example, data objects 103, data object hashing metadata 224, historical data object update data 227, predicted field update frequencies 230, a hashing configuration 233, a machine learning model 236, and potentially other data. The data objects 103 correspond to instances of data corresponding to one or more schemata or object classes. Each data object 103 includes one or more fields 239. A field 239 may correspond to a data primitive, such as a character string, Boolean value, integer, floating point number, and so on, or another data object 103. The data object 103 may correspond to a serialization of a binary object, a row within a relational database management system, a flat-file object specified in JavaScript Object Notation (JSON), an extensible markup language (XML) data structure, or other types of data objects 103.

The data object hash values 218 correspond to hash values that are used to identify versions of data objects 103, much in the same way as a fingerprint. The data object hash values 218 are generated by the hashing application 215 using a hashing algorithm. The data object hash values 218 may have a configurable length, such as 128 bits, 160 bits, 256 bits, 512 bits, and so on. The more bits utilized may reduce the probability of collisions, or that different data objects 103 or states of the data objects 103 may by chance map to the same hash value. The data object hash values 218 may be used by various services to verify whether two data objects 103 are identical, verify whether a cached data object 103 is a latest version, perform document change cataloging, perform state searches, and so on.

The data object hashing metadata 224 is used by the hashing application 215 to generate the data object hash values 218 for data objects 103. In some cases, the data object hashing metadata 224 may be stored in or with the respective data object 103. The data object hashing metadata 224 may have a structure 242, such as a tree or other structure. The structure 242 divides the data object 103 into portions or subportions for hashing. In some cases, the structure 242 may align with the fields 239 in the order they appear within the data object 103. In other cases, the structure 242 may be different such that fields 239 are rearranged or that nodes within the structure 242 cross boundaries of fields 239. The internal hash values 221 correspond to stored, previously generated hash values for portions or subportions of the data objects 103, which are used in generating updated data object hash values 218.

In various embodiments, the data object hash values 218 are updated responsive to every update, a threshold of updates, periodically, in response to a request to access the data object hash values 218, or in response to another event. Thus, the data object hashing metadata 224 may track pending updates 243 in order to aggregate changes to the data object 103 in situations that a threshold of updates is reached, a period expires, the data object hash value 218 is requested to be accessed, or in response to some other event. In operation, the pending updates 243 may mark individual nodes within the structure 242, their parent nodes, and so forth, as invalidated in response to each update, so that when the data object hash value 218 is regenerated for a data object 103, only the internal hash values 221 for the invalidated nodes are updated. In some embodiments, multiple pending updates 243 may be applied in an optimal sequence to avoid recomputing internal hash values 221.

In various embodiments, the data object hashing metadata 224 for a single instance of a data object 103 may include multiple structures 242 that represent the data objects 103 in different ways that may provide for more efficient updating over one another when different fields 239 are updated. For example, the tree structures 100a (FIG. 1A) and 100b (FIG. 1B) may separately be generated as different structures 242 for the same data object 103.

To the extent that individual nodes or internal hash values 221 may be reused or shared across the multiple structures 242, the structures 242 may include pointers or references to the same nodes or internal hash values 242. For example, although the tree structure 100a differs from the tree structure 100b, Hash Value 3 in FIG. 1A is equivalent to Hash Value 2 in FIG. 1B, and Hash Value 4 in FIG. 1A is equivalent to Hash Value 3 in FIG. 1B, so some, but not all, of the internal hash values 221 may be reused or referenced in both tree structures 100*a* and 100*b*. In some cases, multiple tree structures 242 may not share any internal hash values 242. In one approach, the tree structure 100*b* may be used for generating the object hash value 106 (FIG. 1B) when Field 1 is updated, while the tree structure 100*a* may be used for generating the object hash value 106 (FIG. 1A) when Field 2 is updated. A delayed update approach aggregating multiple pending updates 243 may be used to keep each of the multiple structure 242 current as needed.

The historical data object update data 227 may track update operations with respect to data objects 103. The historical data object update data 227 may aggregate update information for all data objects 103, all instances of a single data object 103 schema or class, or across previous states of a single instance of a data object 103. For instance, the historical data object update data 227 may record that a data object 103 corresponding to a person never has a change to the person's birthdate, but that the person's order history changes frequently.

The predicted field update frequencies 230 may be generated from the historical data object update data 227 in order to generate an efficient structure 242 for hashing a data object 103. For example, the predicted field update frequencies 230 may determine that for a person data object 103, the person's order history is likely to change the most, and that the person's birthdate is likely to change the least. This can be used, for example, to promote the order history field 239 to a higher level within the structure 242 and to locate the birthdate field 239 at a lower level within the structure 242.

The hashing configuration 233 may configure aspects of operation for the hashing application 215, such as hashing algorithms used, bit sizes, structures 242, tree depth, and so forth. In some cases, the hashing configuration 233 may include manually specified parameters, such as developer information indicating which fields 239 are going to be updated most frequently. The hashing configuration 233 may specify various thresholds involving a size or a time to apply a hashing algorithm below which an entire data object 103 is hashed without further division for nested hashing. Thresholds related to predicted field update frequencies 230 may control at what point the fields 239 should be promoted to a higher level within the structure 242. The hashing configuration 233 may also specify when the data object hash values 218 are regenerated, e.g., in response to every update, in response to an access of the data object hash values 218, periodically, in response to the number of updates meeting a threshold, or in response to other events.

The machine learning model 236 may be used to automatically determine optimal thresholds, tree depths, and other parameters based on historical data object update data 227 and/or other sources of training data. The machine learning model 236 may utilize the training data set to determine a starting point for optimal parameters, and then the machine learning model 236 may make changes to further optimize the parameters. For example, the machine learning model 236 may cause various values for tree depth or different types of structures 242 to be used, and then observe whether the changes result in efficiency gains.

Figure 3:
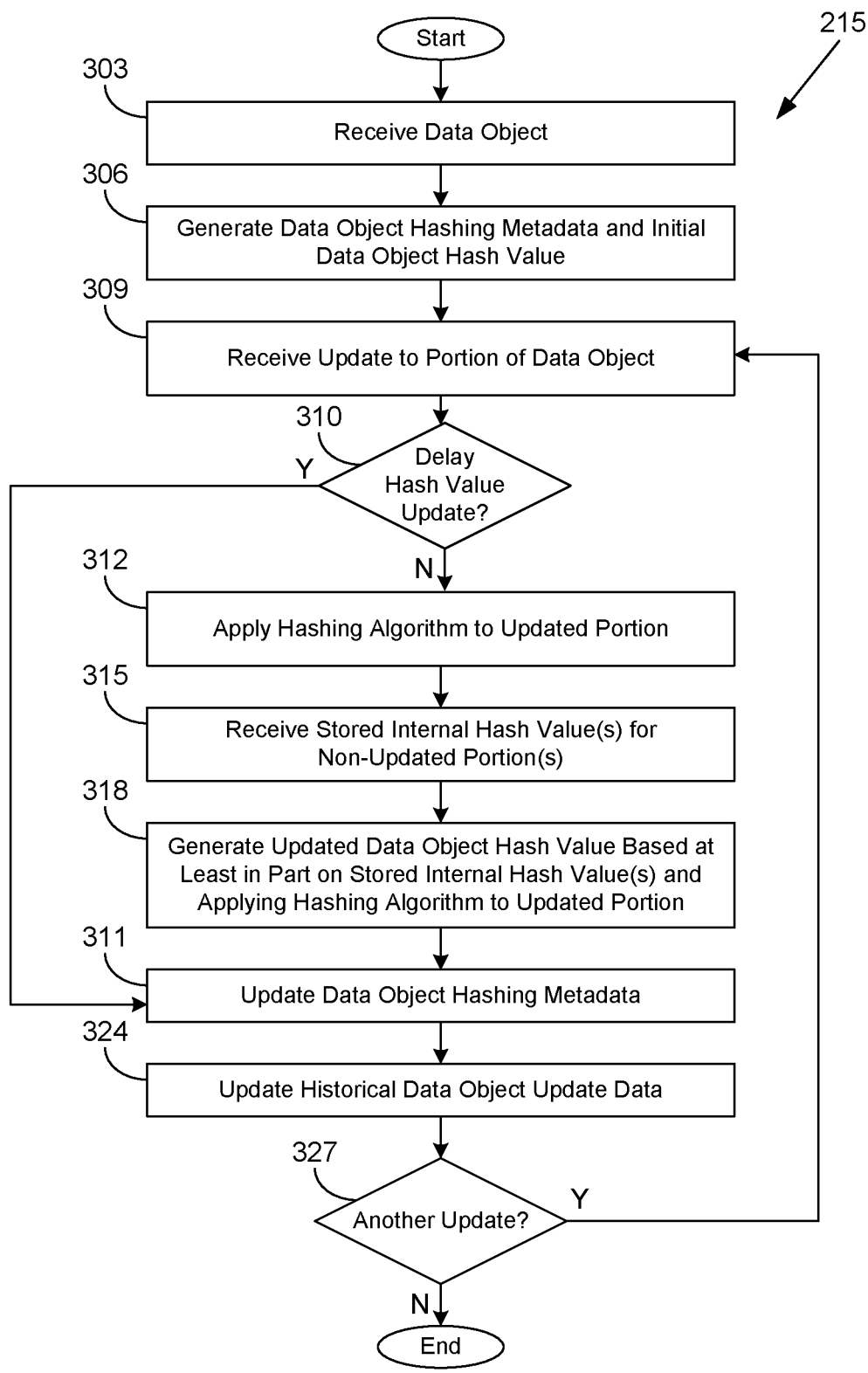
FIG. 3 is a flowchart illustrating one example of functionality implemented as portions of a hashing application executed in the computing environment of FIG. 2 according to various embodiments of the present disclosure.

Referring next to FIG. 3, shown is a flowchart that provides one example of the operation of a portion of the hashing application 215 according to various embodiments. It is understood that the flowchart of FIG. 3 provides merely an example of the many different types of functional arrangements that may be employed to implement the operation of the portion of the hashing application 215 as described herein. As an alternative, the flowchart of FIG. 3 may be viewed as depicting an example of elements of a method implemented in the computing environment 203 (FIG. 2) according to one or more embodiments.

Beginning with box 303, the hashing application 215 receives a data object 103 (FIG. 2). In one example, another service in the computing environment 203 may call the hashing application 215 via an application programming interface (API) in order to hash the data object 103. In another example, the hashing application 215 may be invoked as a command line utility, taking the data object 103 as a parameter. In yet another example, the hashing application 215 may be integrated into a database management system, such that the storing of the data object 103 in the database management system causes the hashing application 215 to be invoked for the data object 103.

In box 306, the hashing application 215 then generates data object hashing metadata 224 (FIG. 2) and the initial data object hash value 218 (FIG. 2) for the data object 103. In doing so, the hashing application 215 may determine an optimal structure 242 (FIG. 2) to be used for generating the data object hashing metadata 224. In this regard, the hashing application 215 may divide the data object 103 into a tree structure 242 for generated nested internal hash values 221 (FIG. 2) based at least in part on respective predicted update frequencies for individual portions of the data object 103. The historical data object update data 227 (FIG. 2) may be used to determine a number of portions into which the data object 103 is divided, as well as a nesting depth for recursively hashing the data object 103.

In various embodiments, the division may be based at least in part on a logical division of a schema of the data object 103 or may be determined without regard to the schema of the data object 103. For example, it may be determined to make all fields 239 (FIG. 2) of the data object 103 into leaf nodes of the structure 242. Alternatively, it may be observed that some fields 239 are much larger in data size than others, and it may make sense to divide the fields 239 into leaf nodes and not at the field boundaries.

In various embodiments, the hashing application 215 may determine predicted field update frequencies 230 (FIG. 2) based at least in part on the historical data object update data 227 and a machine learning model 236 (FIG. 2) so that the fields 239 in the data object 103 may be arranged within the structure 242 in an optimal way. In some embodiments, manual configuration may assist in determining the structure 242. In creating the data object hashing metadata 224, the hashing application 215 generates one or more internal hash values 221, which are in turn hashed one or more times to create other internal hash values 221 and ultimately the data object hash value 218.

In box 309, the hashing application 215 receives an update to a portion of the data object 103, such as an update to one or more fields 239 within the data object 103. In one scenario, the hashing application 215 may receive the updated data object 103 with some metadata or flag indicating which portion of the data object 103 has been changed.

In box 310, the hashing application 215 determines whether to delay updating the data object hash value 218. For example, the hashing application 215 may decide to delay the update to the data object hash value 218 until the data object hash value 218 is accessed, until a threshold number of updates are received, until a period expires, or until another event occurs. If the hashing application 215 determines to delay the update to the data object hash value 218, the hashing application 215 moves to box 311 and updates the data object hashing metadata 224 (FIG. 2) with the update being added to the pending updates 243 (FIG. 2).

Otherwise, the hashing application 215 proceeds to box 312. Where the update is not delayed, the update may in some cases include multiple pending updates 243 having delayed application. Also, to the extent that the update involves applying multiple pending updates 243, the hashing application 215 may apply the pending updates 243 in an optimal sequence or order to most effectively reuse internal hash values 221.

In box 312, the hashing application 215 applies a hashing algorithm to the updated portion of the data object 103. In one example, the hashing application may generate a first internal hash value. In doing so, the hashing application 215 may also discard a stored internal hash value 221 corresponding to a previous state of the updated portion of the data object 103.

In box 315, the hashing application 215 receives stored internal hash values 221 for the non-updated portions of the data object 103 from the data object hashing metadata 224. By receiving the stored internal hash values 221, the hashing application 215 refrains from generating updated internal hash values 221 for portions of the data object 103 that are determined not to be updated.

In box 318, the hashing application 215 generates an updated data object hash value 218 for the updated data object 103 based at least in part on the stored internal hash value 221 and the hashing algorithm being applied to the updated portion of the data object 103. This may involve hashing the data object 103, as part of box 312, along with the internal hash value 221, or hashing the stored internal hash value 221 along with a second internal hash value 221 computed in box 312. In some scenarios, this task may involve recursively performing multiple hashes of a tree structure, for example. For example, child nodes of the tree such as a first internal hash value 221 may be hashed with a stored second internal hash value 221 as a first step, and the resulting internal hash value 221, corresponding to an intermediate node of the tree, may be hashed with another stored second internal hash value 221 as a second step.

Also, the hashing application 215 may determine not to generate an internal hash value 221 for another portion of the data object 103 based at least in part on a size of that portion of the data object 103 or on an update frequency of that portion of the data object 103. For example, the portion of the data object 103 may be below a minimum threshold to require separate hashing of a node in the structure 242, or the frequency of updates to the portion may meet or exceed a threshold that would cause the portion to be promoted to a higher level in the structure 242.

In box 311, the hashing application 215 updates the data object hashing metadata 224 with the newly generated internal hash values 221. Where the data object hashing metadata 224 contains multiple structures 242 for the data object 103, the hashing application 215 may perform boxes 312-318 for one or more of the structures 242 to update the corresponding data object hashing metadata 224. In box 324, the hashing application 215 updates the historical data object update data 227 based at least in part on what portion of the data object 103 was updated.

In box 327, the hashing application 215 determines whether another update to a portion of the data object 103 is received. If another update is received, the hashing application 215 returns to box 309. If another update is not received, the operation of the portion of the hashing application 215 ends.

Figure 4:
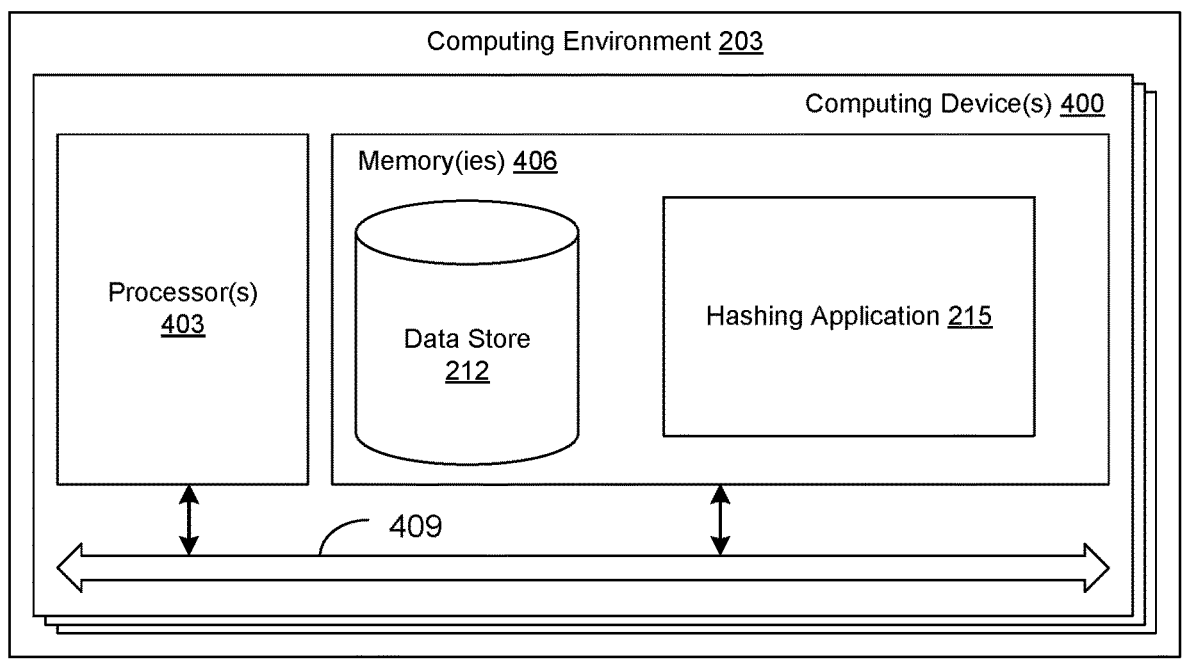
FIG. 4 is a schematic block diagram that provides another example illustration of a computing environment employed in FIG. 2 according to various embodiments of the present disclosure.

With reference to FIG. 4, shown is a schematic block diagram of the computing environment 203 according to an embodiment of the present disclosure. The computing environment 203 includes one or more computing devices 400. Each computing device 400 includes at least one processor circuit, for example, having a processor 403 and a memory 406, both of which are coupled to a local interface 409. To this end, each computing device 400 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 is the hashing application 215 and potentially other applications. Also stored in the memory 406 may be a data store 212 and other data. In addition, an operating system may be stored in the memory 406 and executable by the processor 403.

It is understood that there may be other applications that are stored in the memory 406 and are executable by the processor 403 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and/or multiple processor cores and the memory 406 may represent multiple memories 406 that operate in parallel processing circuits, respectively. In such a case, the local interface 409 may be an appropriate network that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the hashing application 215 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 3 shows the functionality and operation of an implementation of portions of the hashing application 215. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the hashing application 215, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the hashing application 215, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 400, or in multiple computing devices 400 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein when executed the program causes the at least one computing device to at least:

determine that a first portion of a data object has been updated;

generate a first internal hash value for the first portion of the data object;

receive a stored second internal hash value for a second portion of the data object that has not been updated;

generate a third internal hash value by hashing the first internal hash value and the stored second internal hash value;

receive a stored fourth internal hash value for a third portion of the data object that has not been updated;

determine not to generate an internal hash value for a fourth portion of the data object based at least in part on at least one of: a size of the fourth portion of the data object, an update frequency of the fourth portion of the data object, or a time to apply a hashing algorithm to the fourth portion of the data object; and generate a hash value for the data object based at least in part on the fourth portion of the data object, the third internal hash value, and the stored fourth internal hash value.

2. The non-transitory computer-readable medium of claim 1, wherein when executed the program further causes the at least one computing device to at least divide the data object into a tree structure for generating nested hash values based at least in part on respective predicted update frequencies of individual ones of a plurality of portions of the data object.

3. The non-transitory computer-readable medium of claim 1, wherein when executed the program further causes the at least one computing device to at least discard a stored first internal hash value corresponding to a previous state of the first portion of the data object.

4. The non-transitory computer-readable medium of claim 1, wherein when executed the program further causes the at least one computing device to at least determine a number of portions into which the data object is divided based at least in part on historical data object update data.

5. The non-transitory computer-readable medium of claim 1, wherein when executed the program further causes the at least one computing device to at least determine a nesting depth for recursively hashing the data object based at least in part on historical data object update data.

6. A method, comprising:
   determining, via at least one of one or more computing devices, that a first portion of a data object has been updated;
   generating, via at least one of the one or more computing devices, a first internal hash value for the first portion of the data object;
   receiving, via at least one of the one or more computing devices, a stored second internal hash value for a second portion of the data object that has not been updated;
   generating, via at least one of the one or more computing devices, a third internal hash value by hashing the first internal hash value and the stored second internal hash value;
   receiving, via at least one of the one or more computing devices, a stored fourth internal hash value for a third portion of the data object that has not been updated;
   determining, via at least one of the one or more computing devices, not to generate an internal hash value for a fourth portion of the data object based at least in part on at least one of: a size of the fourth portion of the data object, an update frequency of the fourth portion of the data object, or a time to apply a hashing algorithm to the fourth portion of the data object; and
   generating, via at least one of the one or more computing devices, a hash value for the data object based at least in part on the fourth portion of the data object, the third internal hash value, and the stored fourth internal hash value.

7. The method of claim 6, further comprising:
   determining, via at least one of the one or more computing devices, that the second portion of the data object has not been updated; and
   refraining from generating, via at least one of the one or more computing devices, an updated second internal hash value for the second portion of the data object in response to determining that the second portion of the data object has not been updated.

8. The method of claim 6, wherein generating the hash value for the data object further comprises applying, via at least one of the one or more computing devices, a hashing algorithm to the fourth portion of the data object, the third internal hash value, and the stored fourth internal hash value.

9. The method of claim 6, further comprising dividing, via at least one of the one or more computing devices, the data object into the first portion and the second portion based at least in part on a logical division of a schema of the data object.

10. The method of claim 6, further comprising dividing, via at least one of the one or more computing devices, the data object into the first portion and the second portion without regard to a schema of the data object.

11. The method of claim 6, further comprising dividing, via at least one of the one or more computing devices, the data object into the first portion and the second portion based at least in part on an update frequency of the first portion or the second portion.

12. The method of claim 6, further comprising:
   determining, via at least one of the one or more computing devices, a number of portions into which the data object is divided based at least in part on historical data object update data; or
   determining, via at least one of the one or more computing devices, a nesting depth for recursively hashing the data object based at least in part on the historical data object update data.

13. A system, comprising:
   at least one computing device; and
   a hashing application executable in the at least one computing device, wherein when executed the hashing application causes the at least one computing device to at least:
      receive an update to a first portion of a data object;
      generate a first internal hash value for the first portion of the data object;
      receive a stored second internal hash value for a second portion of the data object that has not been updated;
      generate a third internal hash value by hashing the first internal hash value and the stored second internal hash value;
      receive a stored fourth internal hash value for a third portion of the data object that has not been updated;
      determine not to generate an internal hash value for a fourth portion of the data object based at least in part on at least one of: a size of the fourth portion of the data object, an update frequency of the fourth portion of the data object, or a time to apply a hashing algorithm to the fourth portion of the data object; and
      generate a hash value for the data object based at least in part on the fourth portion of the data object, the third internal hash value, and the stored fourth internal hash value.

14. The system of claim 13, wherein when executed the hashing application further causes the at least one computing device to at least divide the data object into a plurality of leaf nodes of a tree structure, wherein individual ones of a plurality of intermediate nodes of the tree structure correspond to a respective hash value generated for one or more respective child nodes of the tree structure.

15. The system of claim 14, wherein a depth of the tree structure is determined based at least in part on historical data object update data.

16. The system of claim 14, wherein a position of the portion of the data object within the tree structure is determined based at least in part on an update frequency prediction of the portion of the data object.

17. The system of claim 14, wherein the data object is associated with a plurality of different tree structures that divide the data object and share one or more stored internal hash values.

18. The system of claim 13, wherein when executed the hashing application further causes the at least one computing device to at least discard a stored internal hash value corresponding to a previous state of the portion of the data object.

19. The system of claim 13, wherein the at least one stored internal hash value is stored within the data object, or the at least one stored internal hash value is stored within metadata associated with the data object.

20. The system of claim 13, wherein the hash value for the data object is generated in response to at least one of:
    determining that a number of updates with respect to the data object meets a threshold; or
    determining that the hash value is to be accessed.

\* \* \* \* \*